(12) United States Patent
Peutert et al.

(10) Patent No.: US 12,167,706 B2
(45) Date of Patent: Dec. 17, 2024

(54) AIR SEEDER METER WITH AIR PURGE

(71) Applicant: SeedMaster Manufacturing Ltd., Emerald Park (CA)

(72) Inventors: Chance Peutert, Emerald Park (CA); Matthew Petruic, Emerald Park (CA); Greg Vennard, Emerald Park (CA); Norbert Beaujot, Emerald Park (CA)

(73) Assignee: SeedMaster Manufacturing, Ltd., Saskatchewan (CA)

( * ) Notice: Subject to any disclaimer, the term of this patent is extended or adjusted under 35 U.S.C. 154(b) by 137 days.

(21) Appl. No.: 18/161,715

(22) Filed: Jan. 30, 2023

(65) Prior Publication Data
US 2023/0292652 A1 Sep. 21, 2023

(51) Int. Cl.
A01C 7/08 (2006.01)
A01C 7/10 (2006.01)
B65G 53/08 (2006.01)

(52) U.S. Cl.
CPC .............. *A01C 7/105* (2013.01); *A01C 7/082* (2013.01); *B65G 53/08* (2013.01)

(58) Field of Classification Search
None
See application file for complete search history.

(56) References Cited

U.S. PATENT DOCUMENTS

| | | | | |
|---|---|---|---|---|
| 2,477,414 A | * | 7/1949 | McBride | B65G 53/4633 406/65 |
| 3,077,272 A | * | 2/1963 | Reinhall | B65G 53/4633 414/220 |
| 3,171,693 A | * | 3/1965 | Gillespie, Jr. | B65G 53/4633 406/67 |
| 4,212,566 A | * | 7/1980 | Kao | B65G 53/4633 406/68 |
| 4,508,473 A | * | 4/1985 | Richter | G01F 11/24 406/64 |
| 4,946,078 A | * | 8/1990 | Heep | B65G 53/4633 222/542 |
| 5,392,964 A | | 2/1995 | Stapp et al. | |
| 5,480,268 A | * | 1/1996 | Smoot | B65G 53/4633 406/65 |
| 6,102,578 A | * | 8/2000 | Heep | B65G 53/4633 384/549 |

(Continued)

FOREIGN PATENT DOCUMENTS

CA 3096040 10/2020

*Primary Examiner* — Joseph A Dillon, Jr.
(74) *Attorney, Agent, or Firm* — Nixon & Vanderhye P.C.

(57) ABSTRACT

A meter apparatus for dispensing agricultural products into a product conduit carrying a product air stream at a product air pressure. A sealed tank is pressurized to a tank pressure that is substantially equal to the product air pressure, and a meter roller mounted on a shaft is mounted in a housing below the sealed tank. A drive is operative to rotate the shaft and the meter roller. Clearance spaces are provided each side of the meter roller. Bearings mount the shaft to the housing, and seals are mounted on the shaft and to the housing between the right and left bearings and the meter roller. The housing defines right and left chambers between the seals and the meter roller. The purging conduit carries a purging air stream at a purging air pressure that is greater than the product air pressure into the chambers, and through the clearance space.

8 Claims, 7 Drawing Sheets

(56) References Cited

U.S. PATENT DOCUMENTS

| | | | | |
|---|---|---|---|---|
| 6,129,246 | A * | 10/2000 | Metzler | B65G 53/4633 |
| | | | | 277/408 |
| 7,413,387 | B2 * | 8/2008 | Pleyer | B65G 53/58 |
| | | | | 406/67 |
| 10,737,890 | B2 * | 8/2020 | Mallaley | B24C 7/0046 |
| 11,452,254 | B2 * | 9/2022 | Stuart | A01C 7/126 |
| 2021/0136998 | A1 * | 5/2021 | Stuart | A01C 7/127 |

\* cited by examiner

AIR SEEDER METER WITH AIR PURGE

This application claims priority to Canadian Serial No. 3,152,768 filed Mar. 17, 2022, the entire contents of each of which are hereby incorporated by reference.

This disclosure relates to the field of agricultural implements and in particular an air seeder meter with a flow of air to keep dust from entering meter bearings.

BACKGROUND

One typical meter for controlled metering of agricultural products, such as seed and fertilizer, from an air seeder tank has a grooved roller that rotates in a housing at the bottom of the tank. Rotation is provided by a shaft extending through the center of the roller and the shaft is mounted on bearings at each end. Seals surround the shaft between the meter roller and the bearings to prevent dust from entering and damaging the bearings. At least some clearance spaces must be provided between the meter roller and the housing to allow the meter roller to rotate, and dust from the agricultural product being dispensed can then enter the housing through the clearance space.

The meter roller rotates in the housing to dispense the agricultural products from the tank into a product conduit carrying a pressurized air stream created by a fan. The tank is sealed and connected to the fan as well so that the pressure inside the tank is substantially the same as the pressure in the product conduit, such that there is only a negligible air flow through the meter.

SUMMARY OF THE INVENTION

The present disclosure provides a meter apparatus that overcomes problems in the prior art. While the seals protecting the bearings from dust and fine particles created in the meter are quite effective, they do not prevent all dust particles from moving toward the bearings. This dust can also accumulate in the clearance spaces between the sides of the meter roller and the housing causing an increased resistance to the meter roller as it turns.

The present disclosure provides a purging air stream in the housing that flows into the housing and outward from the seals toward the meter roller and the clearance spaces and carries any dust created by the agricultural products with it, and prevents the dust from contacting the seals, and passing through the seals to damage the bearings or accumulating in the clearance spaces causing increased torque. The purging air stream is created by an air booster device such as a fan or pump operative to create a purging air stream that has a pressure somewhat above the pressure in the tank and the product conduit. A purging conduit can then be connected to the housing with an inlet between the seals and the meter roller, such that the air in the housing flows out though the clearance spaces toward the lower pressure in the tank and product conduit, carry any dust with it.

In a first embodiment the present disclosure provides a meter apparatus for dispensing agricultural products into a product conduit carrying a product air stream at a product air pressure. The apparatus comprises a sealed tank operative to contain the agricultural products, wherein the sealed tank is pressurized to a tank pressure that is substantially equal to the product air pressure. A meter roller is mounted in a housing below the sealed tank, and a shaft extends through a center of the meter roller. A drive is operative to rotate the shaft and the meter roller. Clearance spaces are provided between the right and left sides of the meter roller to allow the meter roller to rotate in the housing. Right and left bearings mount the shaft to the housing, and right and left seals are mounted to the shaft and to the housing between the right and left bearings and the corresponding right and left sides of the meter roller and operate to substantially seal the corresponding right and left bearings from the meter roller. The housing defines right and left chambers between the right and left seals and corresponding right and left sides of the meter roller, and a purging conduit is connected to the corresponding right and left chambers. The purging conduit carries a purging air stream at a purging air pressure that is greater than the product air pressure, and the purging air stream flows from the purging conduit through the corresponding right and left chambers and through the clearance spaces.

In a second embodiment the present disclosure provides a method of reducing damage to bearings in an air seeder meter, the meter operative to dispense agricultural products into a product conduit carrying a product air stream at a product air pressure. The method comprises providing a sealed tank operative to contain the agricultural products, wherein the sealed tank is pressurized to a tank pressure that is substantially equal to the product air pressure; mounting a meter roller in a housing below the sealed tank; extending a shaft through a center of the roller, and providing a drive operative to rotate the shaft and the meter roller; providing clearance spaces on each side of the meter roller to allow the meter roller to rotate in the housing; providing right and left bearings mounting the shaft to the housing; providing right and left seals mounted to the shaft and to the housing between the right and left bearings and the corresponding right and left sides of the meter roller, wherein the seals are operative to substantially seal the corresponding right and left bearings from the meter roller; providing right and left chambers in the housing between the right and left seals and corresponding right and left sides of the meter roller; conducting a purging air stream into each of the right and left chambers, wherein the purging air stream is at a purging air pressure that is greater than the product air pressure such that the purging air stream flows from each of the right and left chambers through the clearance spaces.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

FIGS. 1-7 illustrate an embodiment of a meter apparatus 1 of the present disclosure for dispensing agricultural products into a product conduit 3 carrying a product air stream PRS at a product air pressure PRP. The apparatus 1 comprises a sealed tank 5 operative to contain the agricultural products and the sealed tank 5 is pressurized to a tank pressure that is substantially equal to the product air pressure PRP.

A meter roller 7 is mounted in a housing 9 below the sealed tank 5. A shaft 11 extends through a center of the meter roller 7, and a drive 13 is operative to rotate the shaft 11 and the meter roller 7. Clearance spaces 15 are provided between on the right and left sides 7R, 7L of the meter roller 7 to allow the meter roller 7 to rotate in the housing 9.

Right and left bearings 17R, 17L rotatably mount the shaft 11 to the housing 9. It is contemplated that bushings could be used instead of bearings however in a typical apparatus bearings will be used and this disclosure considers all such rotatable friction reducing devices to fall under the definition of bearing.

Right and left seals 19R, 19L are mounted to the shaft 11 and to the housing 9 between the right and left bearings 17R, 17L and the corresponding right and left sides 7R, 7L of the meter roller 7 and are operative to substantially seal the corresponding right and left bearings 17R, 17L from the meter roller 7.

The housing 9 defines right and left chambers 21R, 21L between the right and left seals 19R, 19L and corresponding right and left sides 7R, 7L of the meter roller 7. A purging conduit 23 is connected to the corresponding right and left chambers 21R, 21L, and the purging conduit 23 carries a purging air stream PUS at a purging air pressure PUP that is greater than the product air pressure PRP. The purging air stream PUS flows from the purging conduit 23 through the corresponding right and left chambers 21R, 21L and through the clearance spaces 15.

In the illustrated apparatus 1 the purging conduit 23 comprises a right purge outlet 53R connected to the right chamber 21R and a left purge outlet 25L connected to the left chamber 21L such that the purging air stream PUS flows from the purging conduit 23 into the corresponding right and left chambers 21R, 21L through the corresponding right and left purge outlets 25R, 25L.

Figure 8:
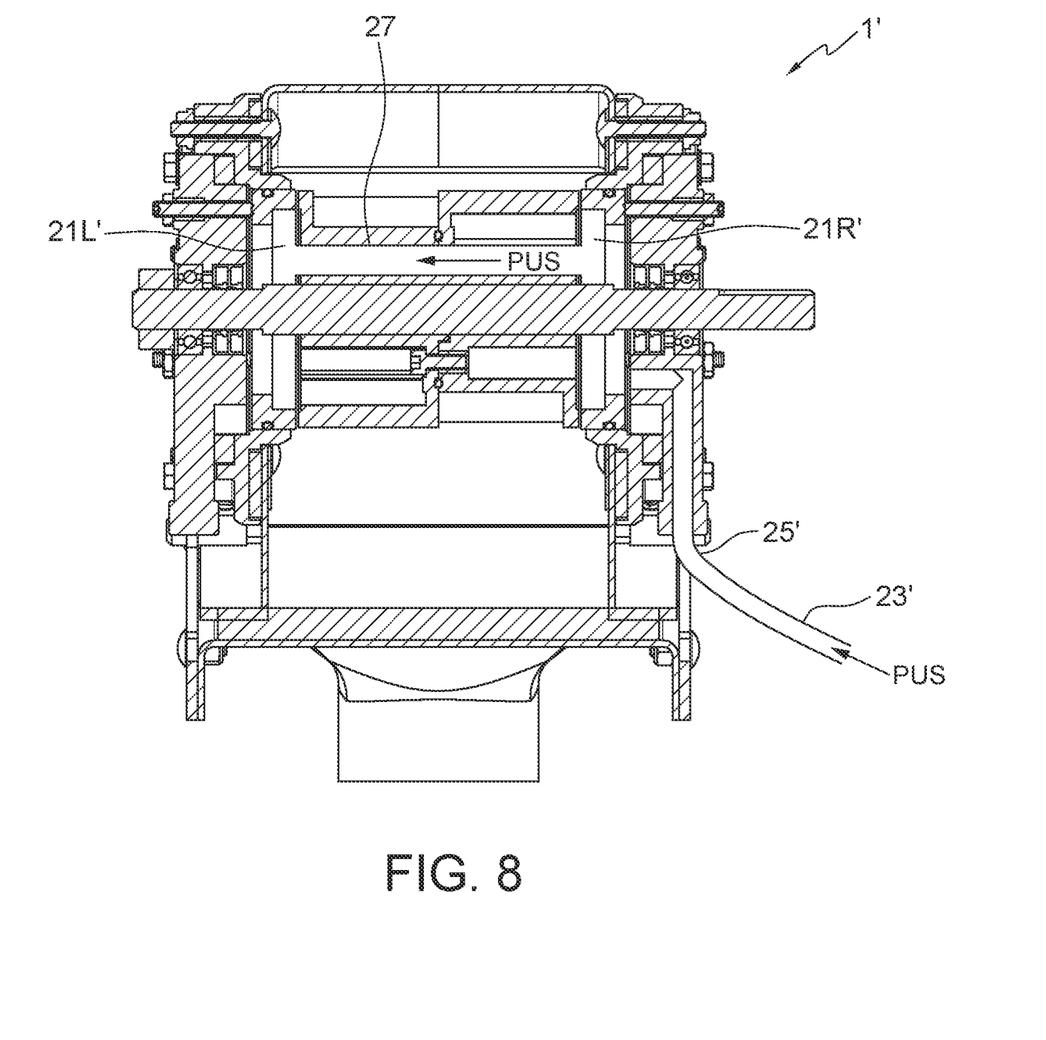
FIG. 8 is a sectional front view of an alternate embodiment the apparatus of the present disclosure.

FIG. 8 shows an alternative embodiment of the apparatus 1' where a purge aperture defined 27' is defined through the meter roller 7' from the right side 7R' of the meter roller to the left side 71' of the meter roller. The purging air stream PUS can then pass through the purge aperture 27' into both the right and left chambers 21R', 21L' and the outlet 25' of the purging conduit 23 can then be connected to either one of the right and left chambers 21R', 21L'.

In a conventional meter arrangement dust and like particles can move through the clearance spaces 15 and bear against the seals 19 and some can pass through the seals into the bearing 17 and cause the bearing to fail. This dust can also plug the clearance spaces 15, increasing the turning resistance of the roller 7. In the present apparatus 1, this purging air stream PUS, with its higher pressure PUP, flows in against the lower pressure PRP in the tanks and meter, and into the chambers 21 and out through the clearances spaces 15 carrying any dust or particles with it, and maintains a clean space inside the chambers 21.

Figure 1:
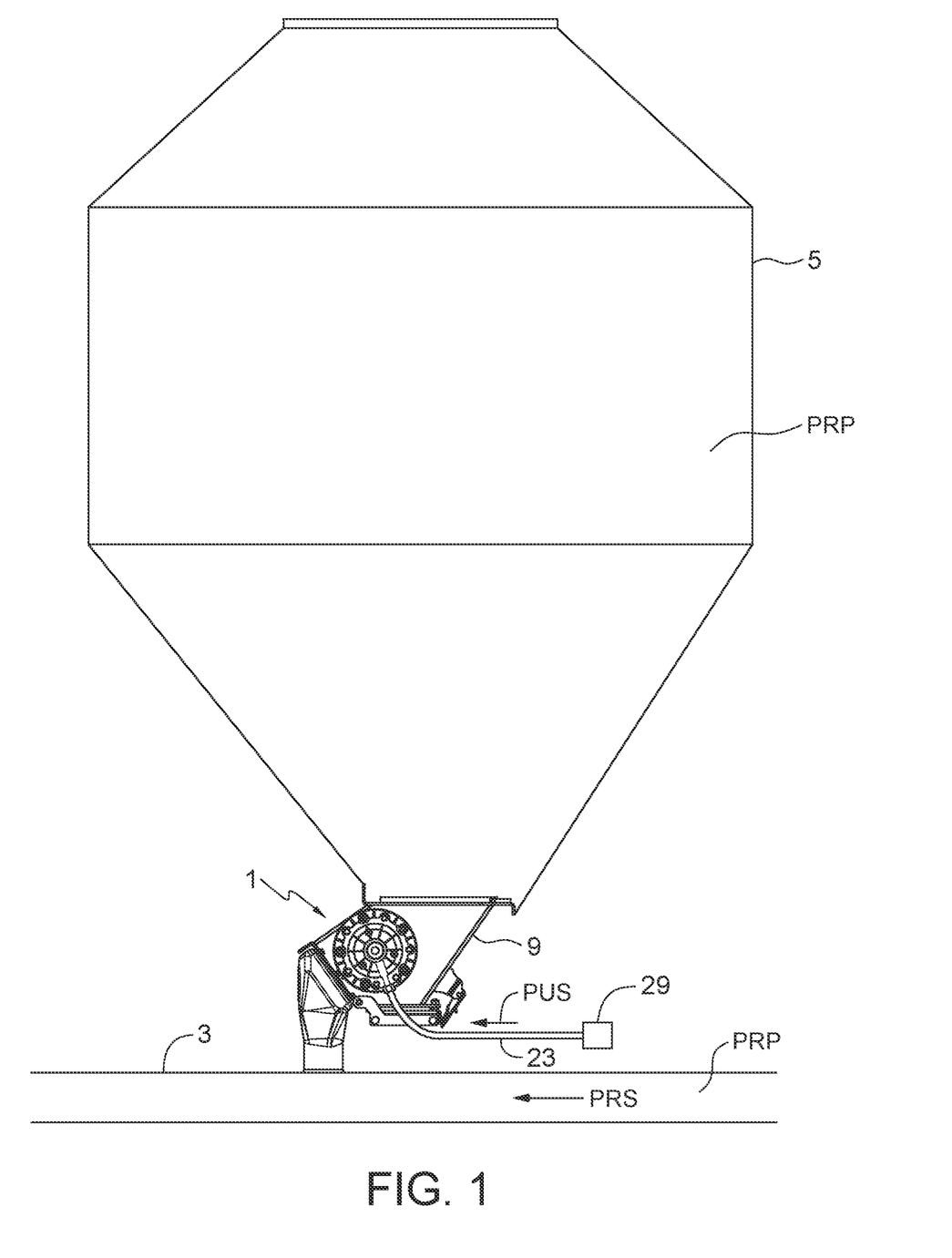
FIG. 1 is a schematic side view of an embodiment of the apparatus of the present disclosure.
Figure 2:
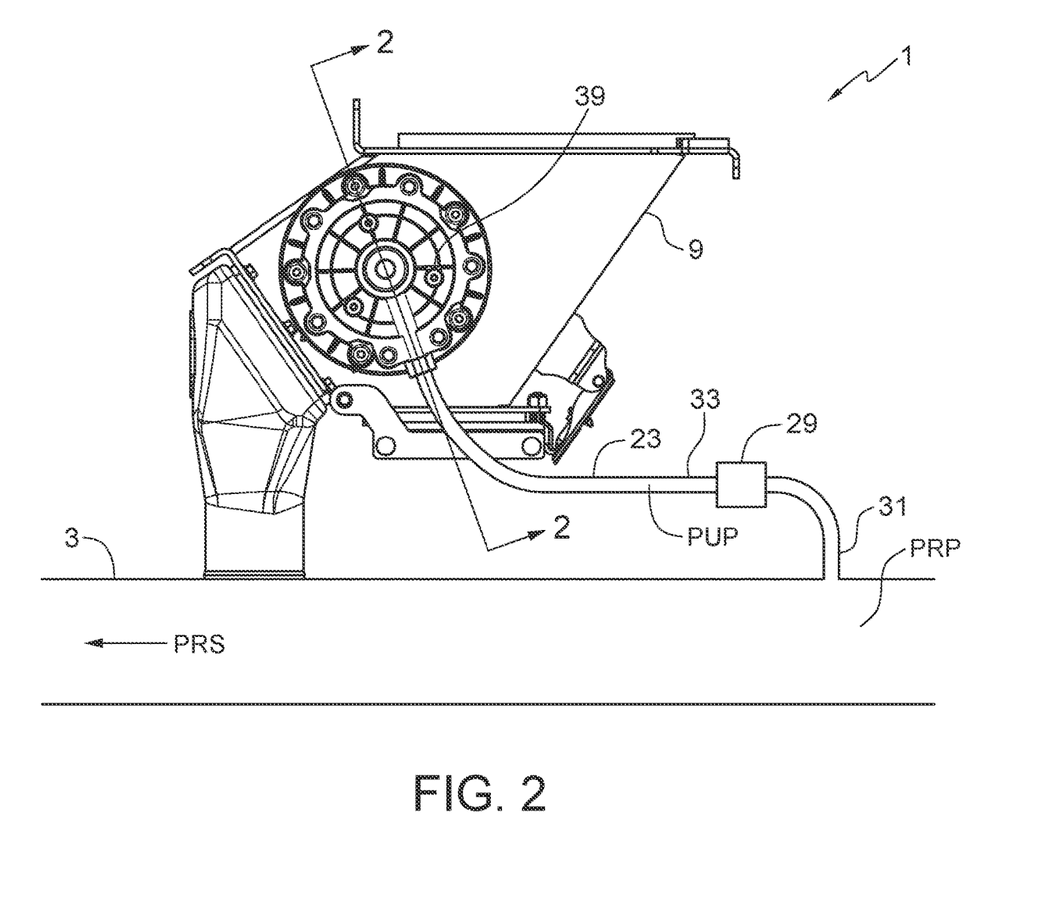
FIG. 2 is an enlarged schematic side view of the embodiment of FIG. 1.
Figure 3:
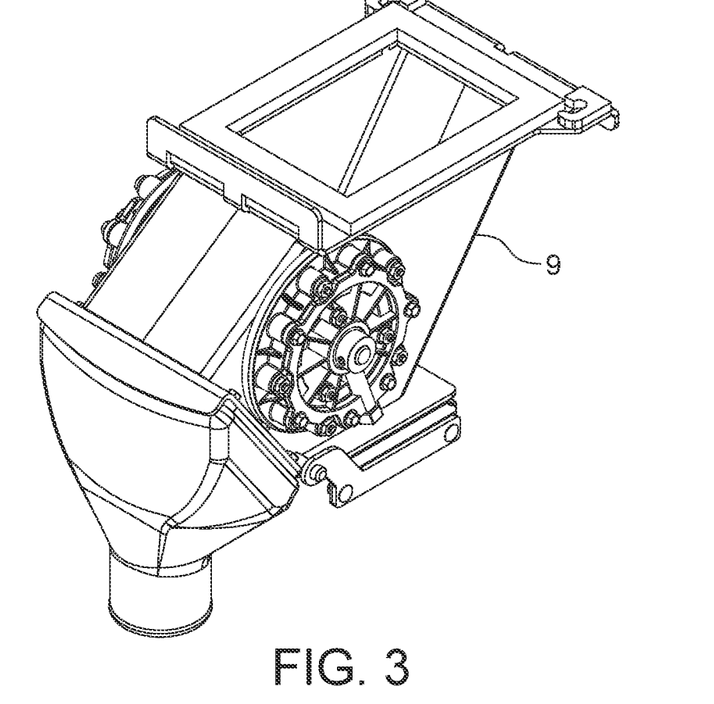
FIG. 3 is a front perspective view of the embodiment of FIG. 1.
Figure 4:
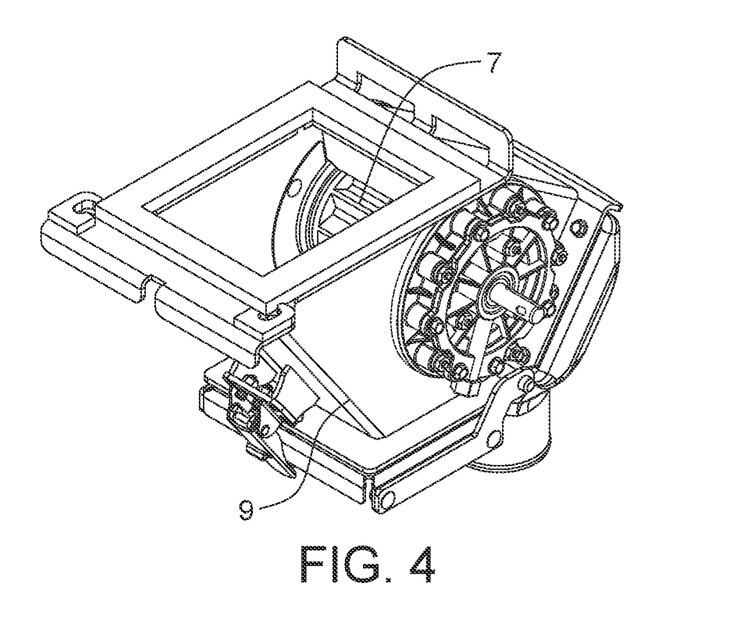
FIG. 4 is a rear perspective view of the embodiment of FIG. 1.

The purging air stream PUS is generated by an air booster device 29 such as a fan or air pump. As shown in FIG. 1 this air booster device 29 can simply draw air in from the atmosphere and increase the pressure to the required pressure PUP. Alternatively to reduce costs the air booster device 29 can be connected at an input end 31 to the product air pressure at some point in the system, and at an output end 33 of the air booster device 29 to the purging conduit 23. Here then the air booster device 29 is only required to raise the product air pressure PRP to the purging air pressure PUP. FIG. 2 shows the intake end 31 of the air booster device 29 conveniently connected to the product conduit 3 which is carrying the product air stream PRS at the product air pressure PRP.

Figure 5:
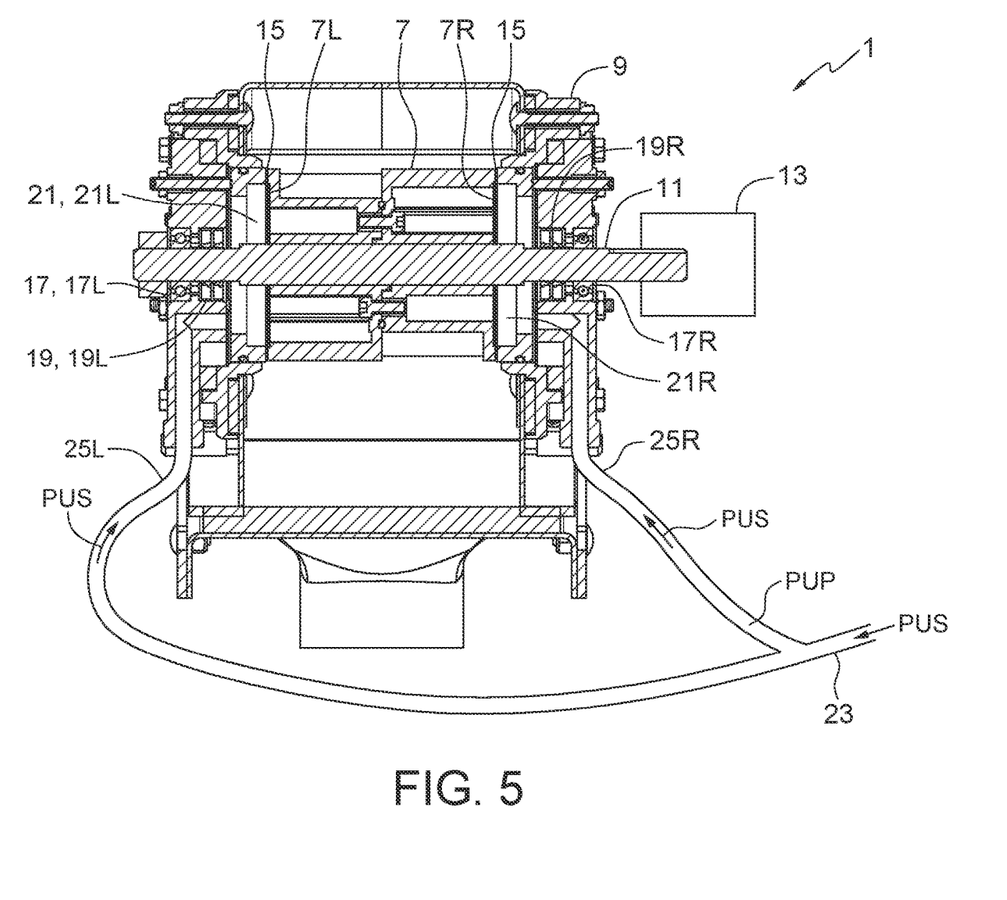
FIG. 5 is a sectional front view of the embodiment of FIG. 1 along line 2-2 in FIG. 2.
Figure 6:
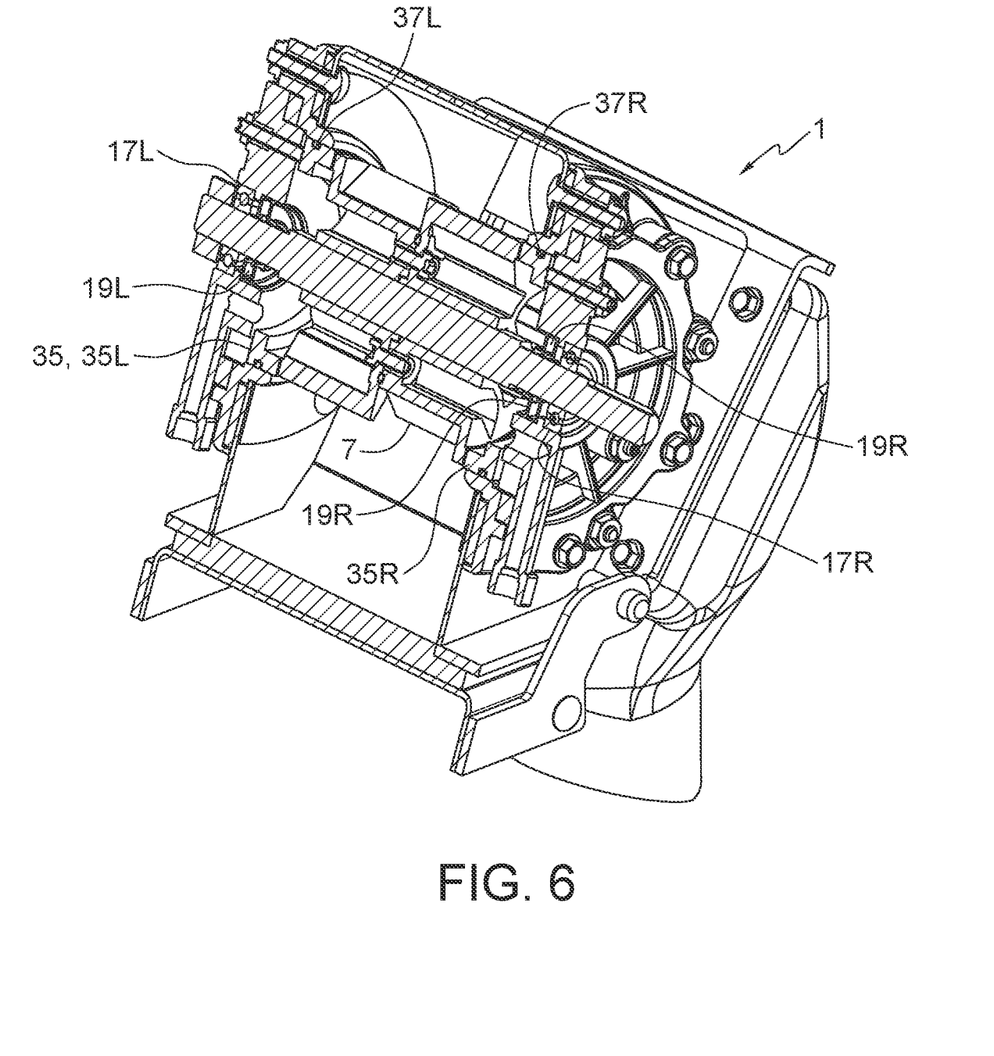
FIG. 6 is a sectional front perspective view of the embodiment of FIG. 1 along line 2-2 in FIG. 2.
Figure 7:
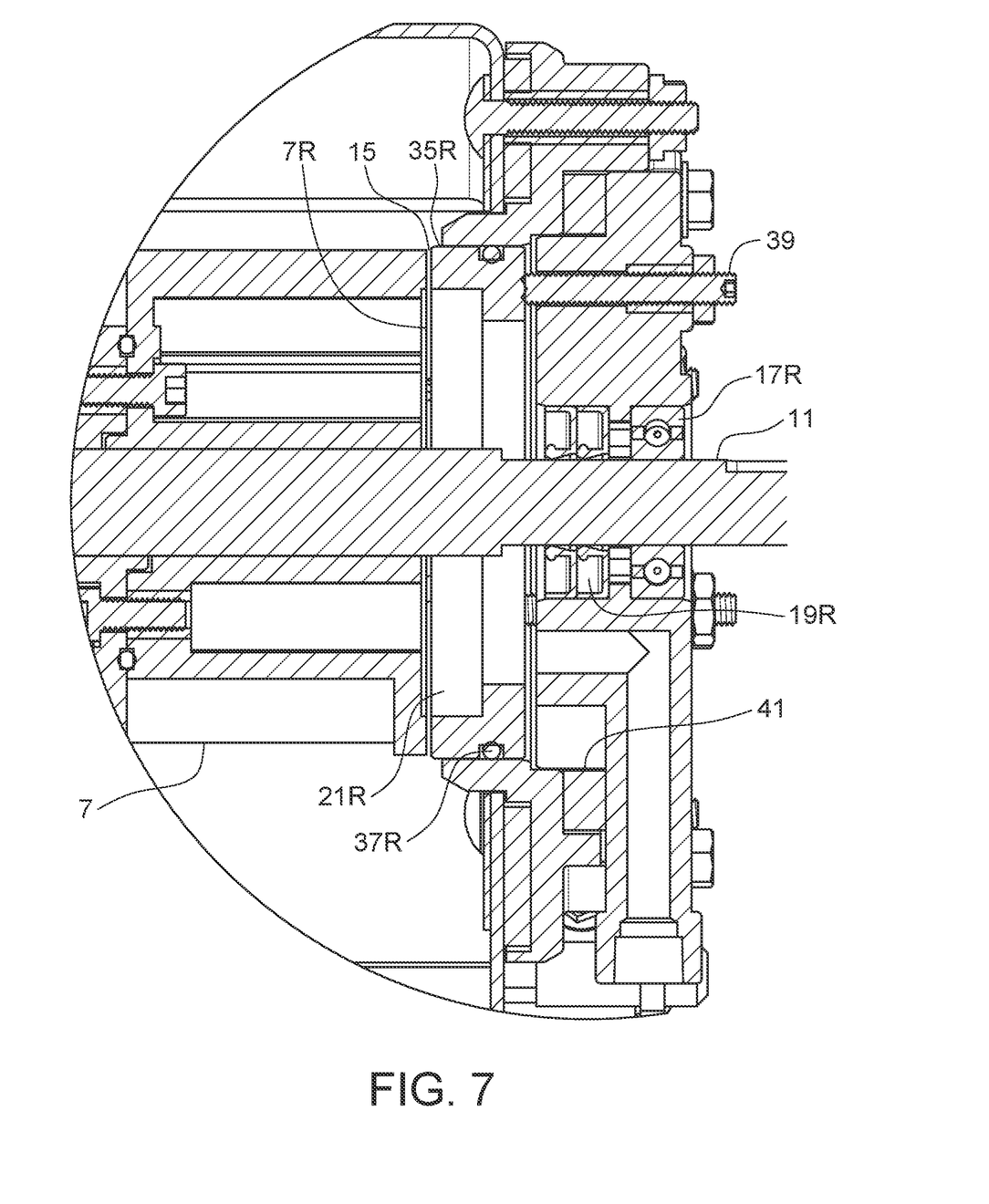
FIG. 7 is an enlarged sectional front view of the embodiment of FIG. 1 along line 2-2 in FIG. 2.

The right and left chambers 21R, 21L form a substantially cylindrical recess in the housing 9 and the shaft 15 extends through a center of the right and left chambers. To seal the chambers right and left ring members 35R, 35L are configured to fit into the corresponding right and left chambers 21R, 21L, and right and left seals 37R, 37L are operative to seal inner surfaces of the right and left chambers 21R, 21L against outer surfaces of the corresponding right and left ring members 35R, 35L. The clearance spaces 15 are provided between right and left sides 7R, 7L of the meter roller 7 and the corresponding right and left ring members 35R, 35L.

A plurality of set screws 39 extend through walls of the housing 9 and are operative to bear against the ring members 35 to adjust the clearance spaces 15. A sealing foam 41 or like material reduces the escape of air through the housing 9.

The present disclosure further provides a method of reducing damage to bearings in an air seeder meter, where the meter is operative to dispense agricultural products into a product conduit carrying a product air stream at a product air pressure. The method comprises providing a sealed tank operative to contain the agricultural products, wherein the sealed tank is pressurized to a tank pressure that is substantially equal to the product air pressure; mounting a meter roller in a housing below the sealed tank; extending a shaft through a center of the roller, and providing a drive operative to rotate the shaft and the meter roller; providing clearance spaces on each side of the meter roller to allow the meter roller to rotate in the housing; providing right and left bearings mounting the shaft to the housing; providing right and left seals mounted to the shaft and to the housing between the right and left bearings and the corresponding right and left sides of the meter roller, wherein the seals are operative to substantially seal the corresponding right and left bearings from the meter roller; providing right and left chambers in the housing between the right and left seals and corresponding right and left sides of the meter roller; conducting a purging air stream into each of the right and left chambers, wherein the purging air stream is at a purging air pressure that is greater than the product air pressure such that the purging air stream flows from each of the right and left chambers through the clearance spaces.

The present disclosure thus provided an apparatus and method for preventing dust from damaging bearings and increasing friction as the meter roller turns. The purging air stream PUS flows out through clearance spaces 15 on each side of the meter roller 7 substantially preventing dust from entering the chambers 21.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A meter apparatus for dispensing agricultural products into a product conduit carrying a product air stream at a product air pressure, the apparatus comprising:
   a sealed tank operative to contain the agricultural products, wherein the sealed tank is pressurized to a tank pressure that is substantially equal to the product air pressure;
   a meter roller mounted in a housing below the sealed tank;
   a shaft extending through a center of the meter roller, and a drive operative to rotate the shaft and the meter roller;
   wherein clearance spaces are provided between the right and left sides of the meter roller to allow the meter roller to rotate in the housing;
   right and left bearings mounting the shaft to the housing;
   right and left seals mounted to the shaft and to the housing between the right and left bearings and the corresponding right and left sides of the meter roller and operative to substantially seal the corresponding right and left bearings from the meter roller;
   wherein the housing defines right and left chambers between the right and left seals and corresponding right and left sides of the meter roller;
   a purging conduit connected to the corresponding right and left chambers, the purging conduit carrying a purging air stream at a purging air pressure that is greater than the product air pressure;
   wherein the purging air stream flows from the purging conduit through the corresponding right and left chambers and through the clearance spaces.

2. The apparatus of claim 1 wherein the purging air stream is generated by an air booster device connected at an input end of the air booster device to the product air pressure and at an output end of the air booster device to the purging conduit, wherein the air booster device is operative to raise the product air pressure to the purging air pressure.

3. The apparatus of claim 2 wherein the input end of the air booster device is connected to the product conduit.

4. The apparatus of claim 1 wherein the purging conduit comprises a right purge outlet connected to the right chamber and a left purge outlet connected to the left chamber such that the purging air stream flows from the purging conduit into the corresponding right and left chambers.

5. The apparatus of claim 1 comprising a purge aperture defined through the meter roller from the right side of the meter roller to the left side of the meter roller, and wherein the purging conduit is connected to one of the right and left chambers.

6. The apparatus of claim 1 wherein the right and left chambers form a substantially cylindrical recess in the housing and the shaft extends through a center of the right and left chambers, and comprising:
   right and left ring members configured to fit into the corresponding right and left chambers;
   right and left seals operative to seal inner surfaces of the right and left chambers against outer surfaces of the corresponding right and left ring members;
   and wherein the clearance spaces are provided between right and left sides of the meter roller and the corresponding right and left ring members.

7. The apparatus of claim 6 comprising a set screw extending through a wall of the housing and operative to bear against one of the right and left ring members to adjust the clearance spaces.

8. A method of reducing damage to bearings in an air seeder meter, the meter operative to dispense agricultural products into a product conduit carrying a product air stream at a product air pressure, the method comprising:
   providing a sealed tank operative to contain the agricultural products, wherein the sealed tank is pressurized to a tank pressure that is substantially equal to the product air pressure;
   mounting a meter roller in a housing below the sealed tank;
   extending a shaft through a center of the roller, and providing a drive operative to rotate the shaft and the meter roller;
   providing clearance spaces on each side of the meter roller to allow the meter roller to rotate in the housing;
   providing right and left bearings mounting the shaft to the housing;
   providing right and left seals mounted to the shaft and to the housing between the right and left bearings and the corresponding right and left sides of the meter roller, wherein the seals are operative to substantially seal the corresponding right and left bearings from the meter roller;
   providing right and left chambers in the housing between the right and left seals and corresponding right and left sides of the meter roller;
   conducting a purging air stream into each of the right and left chambers, wherein the purging air stream is at a purging air pressure that is greater than the product air pressure such that the purging air stream flows from each of the right and left chambers through the clearance spaces.

* * * * *

UNITED STATES PATENT AND TRADEMARK OFFICE
CERTIFICATE OF CORRECTION

| | | |
|---|---|---|
| PATENT NO. | : 12,167,706 B2 | Page 1 of 1 |
| APPLICATION NO. | : 18/161715 | |
| DATED | : December 17, 2024 | |
| INVENTOR(S) | : Chance Peutert et al. | |

It is certified that error appears in the above-identified patent and that said Letters Patent is hereby corrected as shown below:

On the Title Page

Please insert item (30) Foreign Application Priority Data:
--(30) Foreign Application Priority Data
Mar. 17, 2022 (CA) 3 152 768--

Signed and Sealed this
Twenty-fifth Day of February, 2025

Coke Morgan Stewart
*Acting Director of the United States Patent and Trademark Office*